United States Patent [19]

Thut

[11] Patent Number: 5,622,481
[45] Date of Patent: Apr. 22, 1997

[54] SHAFT COUPLING FOR A MOLTEN METAL PUMP

[76] Inventor: Bruno H. Thut, 16755 Park Circle Dr., Chagrin Falls, Ohio 44023

[21] Appl. No.: 336,987

[22] Filed: Nov. 10, 1994

[51] Int. Cl.⁶ ................................................. F16D 9/06
[52] U.S. Cl. ................................. 417/319; 415/9; 403/2
[58] Field of Search ................. 415/122.1, 9; 417/423.6, 417/424.1, 319; 403/2, 305, 301, 300

[56] References Cited

U.S. PATENT DOCUMENTS

| | | | |
|---|---|---|---|
| 2,804,759 | 9/1957 | Hartmann | 403/301 |
| 3,000,577 | 9/1961 | Ferguson | 464/33 |
| 3,126,723 | 3/1964 | Dugay | 64/28 R |
| 3,291,473 | 12/1966 | Sweeney | 415/88 |
| 3,501,178 | 3/1970 | Watts | 403/305 |
| 3,639,072 | 2/1972 | Munkstrand | 415/9 |
| 3,719,436 | 3/1973 | McFarlin | 417/356 |
| 4,169,584 | 10/1979 | Mangalick | 266/214 |
| 4,274,269 | 6/1981 | Trabue | 403/301 |
| 4,411,635 | 10/1983 | Boothroyd et al. | 403/2 |
| 4,604,035 | 8/1986 | Roberts | 417/319 |
| 4,786,230 | 11/1988 | Thut | 415/88 |
| 4,890,945 | 1/1990 | Arter et al. | 403/2 |
| 4,898,367 | 2/1990 | Cooper | 416/189 |
| 4,930,986 | 6/1990 | Cooper | 416/189 |
| 4,940,384 | 7/1990 | Amra et al. | 415/121.2 |
| 4,954,167 | 9/1990 | Cooper | 75/680 |
| 5,025,198 | 6/1991 | Mordue et al. | 318/434 |
| 5,028,211 | 7/1991 | Mordue et al. | 416/204 R |
| 5,143,357 | 9/1992 | Gilbert et al. | 266/235 |
| 5,177,035 | 1/1993 | Gee et al. | 501/82 |
| 5,203,681 | 4/1993 | Cooper | 417/424.1 |
| 5,310,412 | 5/1994 | Gilbert et al. | 75/571 |
| 5,333,963 | 8/1994 | Blumentrath | 403/301 |

FOREIGN PATENT DOCUMENTS 1264126   1/1990   Canada.

OTHER PUBLICATIONS

One page advertisement for L Series molten metal pumps by Metaullics Systems Co., undated.
One page advertisement for M Serial Aluminum Molten Metal Pumps by Metaullics Systems, Co,, undated.
One page schematic drawing for a molten metal pump, source unknown, undated.
Six page brochure for "M Series" molten metal pumps by Metaullics Systems Co., copyright 1984.
Sixteen page operating instruction booklet for Metaullics Molten Transfer Pumps, by the Carborundum Company, copyright 1980.

(List continued on next page.)

Primary Examiner—Timothy Thorpe
Assistant Examiner—Peter G. Korytnyk
Attorney, Agent, or Firm—Watts, Hoffmann, Fisher & Heinke Co., L.P.A.

[57] ABSTRACT

An apparatus for pumping molten metal is disclosed. The apparatus includes a submergible pump housing, a rotatable impeller disposed within the pump housing, an impeller shaft having one end coupled to the impeller and extending through an opening in the pump housing, a motor-driven rotating drive shaft and a coupling member engaging an end of the drive shaft and an opposite end of the impeller shaft and a shear pin extending between the coupling member and one of the drive shaft and impeller shaft thereby coupling the drive shaft and the impeller shaft. Preferably, the coupling member is a female coupling member having two shaft receiving openings receiving the drive shaft end and the second end of the impeller shaft and includes a pair of aligned transverse apertures. A graphite pin is inserted through the coupling member apertures and extends through a transverse bore near the end of the impeller shaft. The graphite pin is held in place by a wire wrapped around an outer periphery of the coupling. The wire includes looped ends which are adapted to be twisted and thereby holding the pin in place.

13 Claims, 3 Drawing Sheets

OTHER PUBLICATIONS

Sixteen page operating instruction booklet for Metaullics Transfer Pump Systems for Molten Metal Metaullics Systems Co., copyright 1984.

Sixteen page operating instruction booklet for Metaullics De–Gas/De–Mag systems for Aluminum, Metaullics Systems Co., dated Apr. 1, 1985.

Four page folder listing models of molten metal pumps by High Temperature Systems, Inc., published at least as early as Jun., 1990.

One page advertisement for replacement parts for M9000CSD Gas Injection Pump, High Temperature Systems, Inc., published at least as early as Oct., 1986.

One page advertisement for replacement parts for A5000C and A9000CMolten Metal Pump, High Tempeature Systems, Inc.,published at least as early as Sep. 1986.

One page advertisement for replacement parts for M5000CDS gas injection pump High Temperature Systems, Inc.,published at least as early as Oct., 1986.

One page advertisement for replacement parts for M5000C molten metal pump High Temperature Systems, Inc., dated Jul. 1986.

Fourteen page operating instruction booklet for Metaullics Circulation Systems for Aluminum, Metaullics Systems Co., copyright 1984.

Four page installation booklet for Mark II molten metal pumps, High Temperature Systems, Inc.,published at least as early as Sep. 1973.

5,622,481

SHAFT COUPLING FOR A MOLTEN METAL PUMP

FIELD OF THE INVENTION

This invention relates to an apparatus for pumping molten metal including a coupling member for coupling a motor-driven drive shaft and an impeller shaft and, more particularly, a coupling member including a graphite shear pin having a predetermined shear strength to protect other apparatus components from failure.

BACKGROUND OF THE INVENTION

Molten metal pumps are widely used in foundries and smelting facilities to convey molten metal from a melting or holding furnace to subsequent casting or metal forming stations. One example of such a molten metal pump apparatus is disclosed in applicant's Canadian Patent No. 1,264,126, issued Jan. 2, 1990, entitled "Dual Volute Molten Metal Pump and Selective Outlet Discriminating Means," which is incorporated herein in its entirety by reference.

Normally, such a molten metal pump apparatus includes a motor mounted above a molten metal bath. The motor drives a rotatable impeller pump having one or more impellers submerged in the bath. In operation, the rotating impellers draw molten metal from the bath and pump it through a conduit routed to a subsequent station for further processing. The impellers are coupled to one end of a vertically oriented impeller shaft. An opposite end of the impeller shaft extending above the molten metal bath is affixed to a female coupling member. In pump apparatuses of conventional design, the end portion of the impeller shaft is threaded. To secure the impeller shaft the coupling member, the impeller shaft is screwed into a correspondingly internally threaded portion of the female coupling member. An end of a drive shaft extending from the motor is received in the coupling member and pinned thereto providing a mechanical linkage between the rotating motor drive shaft and the pump impellers.

Suspended in the molten metal bath are a variety of solid objects including unmelted raw materials, occluded impurities and insoluble foreign materials such as firebrick spalled from the furnace walls, chunks of cement, metal oxide accretions, etc. If a sufficiently large object is drawn into the impeller pump, the object may become lodged between the rotating impellers and a pump housing surrounding the impellers thereby blocking the continued rotation of the impellers. Blocking the impellers results in a twisting or torsional force being applied to the rotating components of the pump apparatus, i.e., the motor drive shaft, coupling member, impeller shaft and impellers. If the torsional force applied to a component exceeds the maximum or fracture point torsional strength of the component, it will fail. The fractional point torsional strength of a component is the magnitude of torsional force that causes failure of the component.

Even if the lodged object only momentarily jams the impellers and then passes through the pump without causing catastrophic failure of a pump apparatus component, the momentary blockage results in a torsional force being applied to the rotating components. Repeatedly subjecting a pump apparatus component to a torsional force near its fracture point torsional strength value will weaken the component thereby increasing the probability of premature failure.

The repair or replacement of a failed pump component is a costly, time consuming, and potentially dangerous task given the proximity of the hot molten metal. For example, if the impeller shaft fractures, the portion of the impeller shaft below the fracture point must be removed, along with the impeller pump, from the molten bath and the shaft portion disengaged from the impeller pump. Additionally, the portion of the impeller shaft above the fracture point must be unscrewed from the coupling member.

Although some steps can be taken to reduce the number and size of solid objects drawn into the impeller pump, for example, by limiting the size of the entry ports to the pump impellers and/or providing a screen mesh over the impeller entry ports, it is virtually impossible to prevent all objects capable of jamming the impellers from entering the pump without unduly restricting the entry of molten metal to the impellers.

Based on the foregoing, an improved molten metal pump apparatus that protects against both catastrophic failure and torsional force induced weakening of expensive pump components remains an objective of designers of such pumps.

DISCLOSURE OF THE INVENTION

An apparatus for pumping molten metal constructed in accordance with the present invention includes a submergible pump housing, a rotatable impeller disposed within the pump housing and an impeller shaft having a first and second end, the first end coupled to the impeller and extending through an opening in the pump housing. The apparatus also includes a motor-driven rotating drive shaft, a coupling member engaging an end of the of the drive shaft and the second end of the impeller shaft and a shear pin that extends between the coupling and one of the impeller and drive shafts.

In the preferred embodiment, the coupling member is a female coupling member having two shaft receiving openings adapted to receive an end of the motor-driven drive shaft and the second end of the impeller shaft. The coupling member has a pair of apertures diametrically aligned transversely of the shaft and one of the shafts has a transverse bore aligned with the apertures. Preferably, the transverse bore is in the impeller shaft. The shear pin fits into a passageway defined by the transverse bore and the pair of apertures. The shear pin has a shear strength value less than a fracture point torsional strength value of the weakest of the pump apparatus components to be protected. The preferred material for the shear pin is graphite, which is not subject to a loss of strength due to repeated stressing. A graphite shear pin will shear or fracture at a known, predetermined loading value.

The apparatus additionally includes structure for maintaining the shear pin in place. The structure includes an annular groove in the outer periphery of the coupling member, the groove being interrupted by each of the aligned apertures, and a wire having a length greater than the circumference of the coupling member and disposed in the annular groove with end portions twisted together. Advantageously, the wrapping wire includes a loop at each end of the wire permitting insertion of an extending portion of a hand tool through the loops to rapidly twist the wire thereby securing the wire in place.

An alternate embodiment of the present invention features a coupling member with a plurality of pairs of axially aligned apertures, each pair of aligned apertures having a different diameter. This permits use of the coupling member with shear pins of varying diameters and with a variety of impeller shafts having different transverse bore diameters.

One object of this invention is to provide an apparatus for pumping molten metal including a coupling member and coupling member shear pin to protect components of the apparatus from damage when a solid object in the molten metal bath is drawn into the impeller pump and jams the impellers.

Another object of the invention is to provide an apparatus for pumping molten metal including a coupling member and coupling member shear pin to protect apparatus components from loss of strength due to repeated stressing during operation of the pump apparatus.

Yet another object of the invention is to provide an apparatus for pumping molten including a coupling member and coupling member shear pin wherein the shear pin has a predetermined shear strength which is less than the fracture point torsional strength value of a selected pump apparatus component or components.

Another object of this invention is to provide an apparatus for pumping molten metal including a coupling member and coupling member shear pin wherein the shear strength does not decrease with repeated stressing of the pin.

Still another object of this invention is to provide an apparatus for pumping molten metal including structure for securing a coupling member shear pin in place wherein the shear pin extends through a diametrical crossbore near an end of the impeller shaft and a pair of aligned apertures in the coupling member.

Yet another object of this invention is to provide an apparatus for pumping molten metal including a coupling member and coupling member shear pin wherein the shear pin is held in position by a surrounding wire.

These and other objects, advantages and features of the invention will become better understood from a detailed description of a preferred embodiment which is described in conjunction with the accompanying drawings.

DETAILED DESCRIPTION

Figure 1:
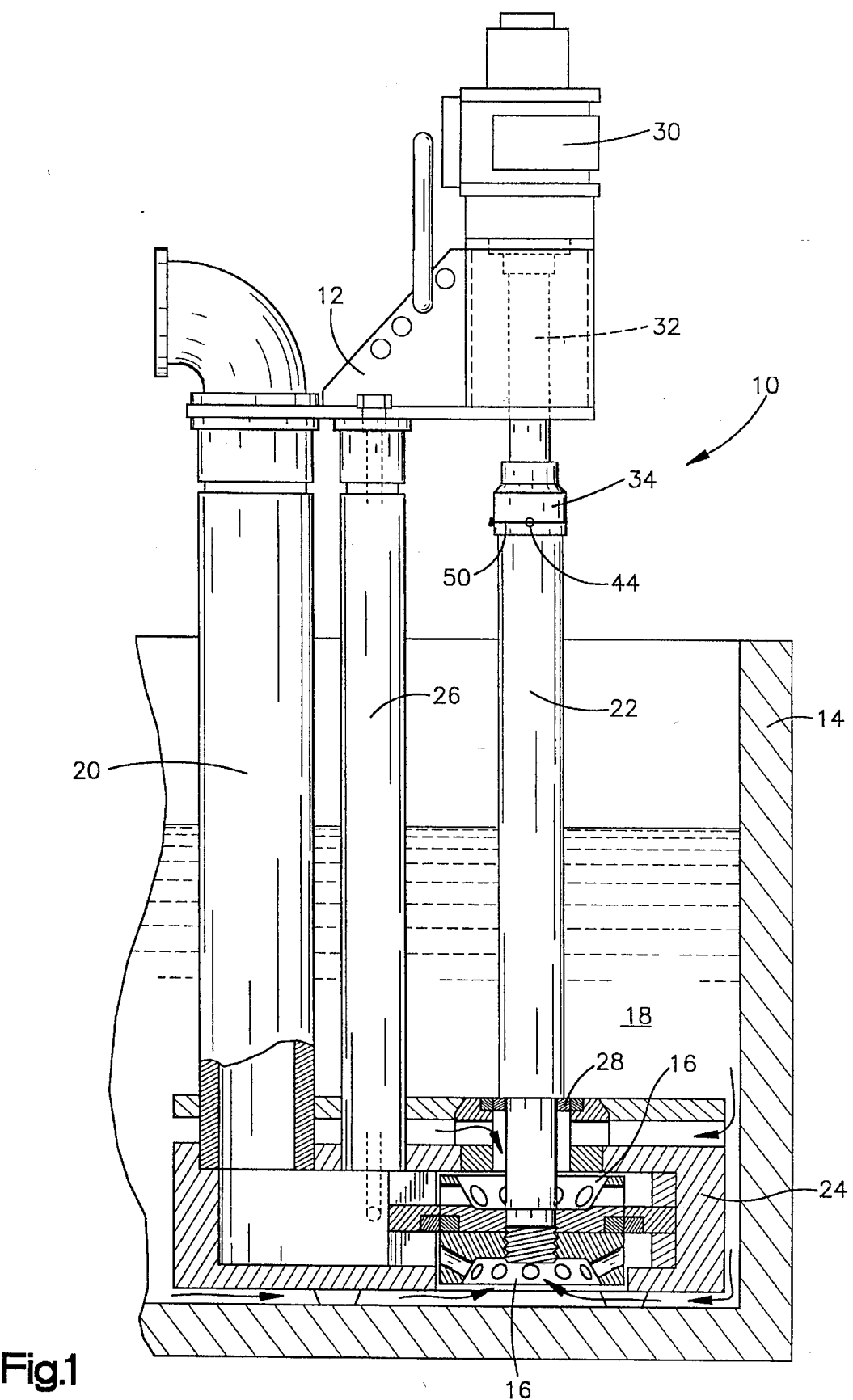
FIG. 1 is a view, partly in section and partly in front elevation, of an apparatus for pumping molten metal including a shaft coupling member of the present invention.

With reference to FIG. 1, an apparatus for pumping molten metal embodying the present invention is shown generally at 10. The apparatus is mounted to a support fixture 12 disposed within a molten metal furnace 14. The pump apparatus 10 includes a pair of rotating impellers 16 which draw molten metal from a molten metal bath 18 and pump the molten metal through a conduit 20 to a subsequent processing station or furnace (not shown). The impellers 16 are enclosed within a pump housing 24 in fluid communication with the conduit 20 and are affixed to an decreased diameter portion of an impeller shaft 22. The pump housing 24 is supported by a vertical rod 26 extending from the support fixture 12 and includes a bearing 28 surrounding the impeller shaft 22. A motor 30 is mounted atop the support fixture 12 and has a downwardly extending drive shaft 32. A female coupling member 34 couples an end 32A of the motor drive shaft 32 and an end 22A of the impeller shaft 22 that is above the molten metal bath 18. In operation, the rotating motor drive shaft 32 drives the pair impellers 16. The rotating impellers 16 draw molten metal from the molten metal bath 18 and cause it to flow through the conduit 20.

Figure 2:
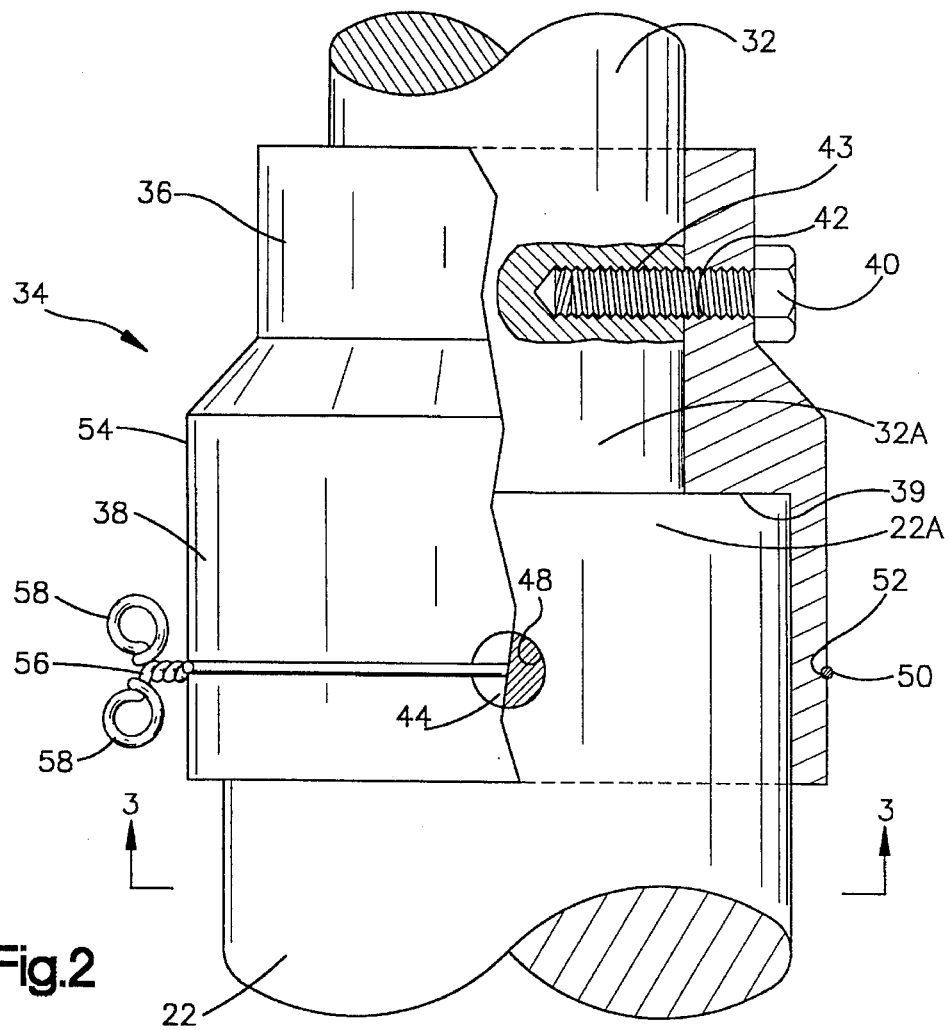
FIG. 2 is a view, partly in section and partly in front elevation, of-the shaft coupling member of FIG. 1 showing a graphite shear pin securing an impeller shaft and a motor-driven drive shaft pinned to the coupling member.
Figure 3:
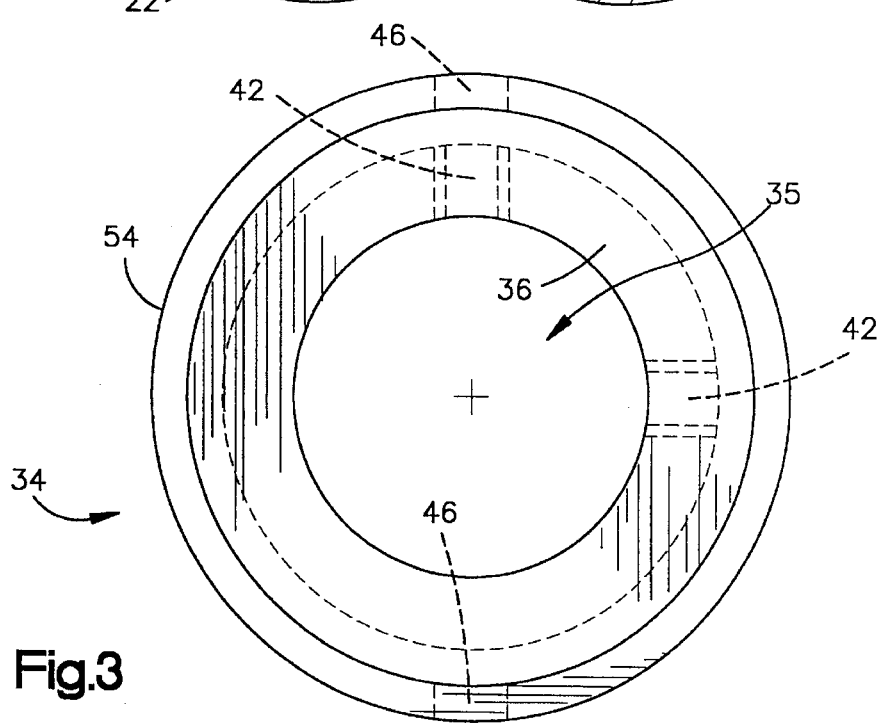
FIG. 3 is a bottom plan view of the shaft coupling member of FIG. 1.

Turning to FIGS. 2 and 3, the coupling member 34 of the present invention is preferably annular in transverse cross section (FIG. 3) and defines a stepped interior cavity 35 accommodate shafts 22 and 32, which are of different diameters. The coupling member interior cavity 35 is dimensioned to receive an end of the motor drive shaft 32 in an upper portion 36 of the coupling member and similarly receive an end of the impeller shaft 22 in a lower portion 38 of the coupling member. An interior stepped portion 39 provides a stop for the end of the impeller shaft 22. The motor drive shaft is pinned to the coupling member 34 with two threaded bolts 40 (only one of which can be seen in FIG. 2) which extend through corresponding threaded apertures 42 in tim coupling member upper portion 36 and into threaded crossbores 43 (only one of which can be seen in FIG. 2) extending radially inwardly a distance just less than a radius of the motor drive shaft 32.

A shear pin 44 secures the impeller shaft 22 to the coupling member 24. The shear pin 44 extends through aligned apertures 46 in the coupling member lower portion 38 (the apertures 46 being 180 degrees apart) and through a crossbore 48 of the impeller shaft 22. A pin retainer including a wrapping wire 50 is used to maintain the shear pin 44 in position within a passageway defined by the apertures 46 and the aligned impeller shaft crossbore 48. To facilitate positioning and tightening the wrapping wire 50 about the coupling member 34 and to the prevent the wire 50 from sliding axially with respect to the coupling member 34 after being tightened, the pin retainer also includes an annular groove or notch 52, which intersects the aligned apertures 46, is formed in an outer surface 54 of the coupling member.

After the impeller shaft 22 is inserted into the coupling member bottom portion 38 and properly rotated to align the crossbore 48 with the coupling member apertures 46, the shear pin 44 is inserted. The shear pin 44 is dimensioned such that it fits snugly but slidingly in the passageway defined by the crossbore 48 and the aligned apertures 46 (the crossbore 48 and the aligned apertures 46 having the same diameter) and is of a length such that it is substantially flush with the coupling member outer surface 54. After inserting the shear pin 44, the wrapping wire 50 is positioned over the groove 52 so as to encircle the shear pin 44. The wrapping wire 50 has a length which is somewhat greater than an outer diameter of the coupling member lower portion 38 to provide sufficient overlap to allow multiple twists 56 of the wire to secure it in place. Preferably, each end of the wrapping wire 50 terminates in a loop 58 which facilitate twisting the wire. A hand tool (not shown), such as a handcrank or screwdriver, having a narrow extending portion, may be inserted through the loops 58 and rotated to twist the wire 50 and secure it in place. To remove the wrapping wire, the multiple twists 56 may be unwound using the hand tool or metal cutting implements may be used to simply snip the wire 50 without the necessity of unwinding it. Wire such as the type used to secure rebar used in reinforcing concrete, can advantageously be used as the wrapping wire 50.

During operation of the pump apparatus 10, a variety of solids suspended in the molten metal bath 18, including unmelted raw materials, occluded impurities and insoluble foreign materials such as firebrick spalled from the furnace walls, chunks of cement, metal oxide accretions, etc., may be drawn into the impellers 16. If the indrawn object is of sufficient size, it may become lodged between the rotating impellers 16 and the pump housing 24 surrounding the impellers thereby blocking their continued rotation. Jamming the impellers 16 causes a twisting or torsional force to be applied to the rotating components of the pump apparatus 10, i.e., the motor drive shaft 32, the coupling member 34, the impeller shaft 22 and the impellers 16. The torsional force will fracture a rotating component if the applied torsional force exceeds the fracture point torsional strength of the component, that is, the torsional force magnitude that results in failure of the component.

Even if the lodged object only momentarily jams the impellers 16 and then passes through the pump apparatus without causing failure of a pump apparatus component, the momentary blockage stresses the rotating components. If a component is repeatedly stressed by torsional forces near the component's fracture point torsional strength, the component will be weakened, i.e., its strength will he reduced and the component will be subject to premature failure.

The present invention utilizes the coupling member shear pin 44 to protect other more expensive and difficult to replace components of the pump apparatus 10. Preferably, the shear pin 44 is comprised of graphite, although other materials such as aluminum oxide and boron carbide as well as other ceramic materials, may be used. When the impellers jam, the shear pin 44 will be subjected to a lateral shearing force. The shear strength of a graphite shear pin 44 is proportional to the pin's cross sectional area. The shear strength value for a graphite shear pin 44 of a given diameter may be determined experimentally or by referring to a material engineering handbook. If the fracture point torsional strength values of the rotating pump apparatus components sought to be protected are known or can be determined, a graphite shear pin 44 having an appropriate cross sectional area may be chosen, that is, a shear pin having a shear strength less than a fracture point torsional strength value of the weakest of the components. That is, if an object jams the impellers 16, the graphite shear pin 44 should shear or fracture before a fracture point torsional strength value of any of the more expensive pump components is exceeded. This protects the more expensive pump components both from catastrophic failure. Additionally, if the shear pin shear strength is chosen that is significantly less, for example ten percent less, than the minimum fracture point torsional strength of the components to be protected, the components will be protected both from catastrophic failure and stress induced failure resulting from repeatedly stressing a component near its fracture point torsional strength.

If the cross sectional area of a solid graphite shear pin 44 which fits snugly into the passageway defined by the impeller shaft crossbore 48 and the coupling member apertures 46 provides excessive shear strength, the cross sectional area of the shear pin may by reduced to the desired value by drilling an appropriate sized hole longitudinally through the shear pin. If the cross sectional area of the solid graphite shear pin 44 is less than the desired cross sectional area, a larger diameter shear pin would be required (which would necessitate correspondingly increasing the diameters of the coupling member aligned apertures 46 and the impeller shaft crossbore 48). Alternatively, a second shear pin (not shown) could be used with a corresponding second set of coupling member aligned apertures (not shown) and a second impeller shaft crossbore (not shown) to achieve the desired shear strength.

Among the advantages of using a graphite shear pin 44 is that it is not subject to a loss of strength due to repeated stressing. It will shear or fracture at a known, predetermined shear strength value which can readily be calculated if the cross sectional area is known. Thus, a shear pin 44 comprised of graphite will not be subject to weakening or loss of strength over time by repeated stresses as are conventional shear pin materials, when stressed. With a graphite shear pin 44, the pin will fracture at a known, predetermined shear strength value that will not change over time. These advantageous attributes of graphite permits a shear pin shear strength value to be "dialed in" which provides protection from stress included and catastrophic failure for the more expensive pump apparatus while minimizing unnecessary failure of the shear pin due to stress induced weakening.

Additional advantages of a graphite shear pin include graphite's tolerance to the high temperatures in the furnace 14 and its relative low cost compared to other materials suitable for use as a shear pins in such an environment. Moreover, if the graphite shear pin 44 does fail and a portion of the pin falls into the molten metal bath 18, the relatively low density of graphite vis-a-vis the density of the molten metal bath 18 will cause the portion of the pin in the bath to float near a surface thereby facilitating its retrieval. Further, by cutting or unwinding the wrapping wire 50 overlying the fractured pin 44, a new graphite pin may be easily installed and production resumed in short order.

In addition to protecting the more expensive pump apparatus components, the coupling member of the present invention facilitates routine maintenance activities. The impeller shaft 22 is subject to wear at the surface of the molten metal bath 14. When the impeller shaft 22 is to be replaced, it is much easier for maintenance personnel to disengage the impeller shaft from the coupling member 34 by snipping the wrapping wire 50 and removing the shear pin 44 than by unscrewing the impeller shaft 22 from a threaded coupling member as required in molten metal pump apparatuses of present design.

Figure 4:
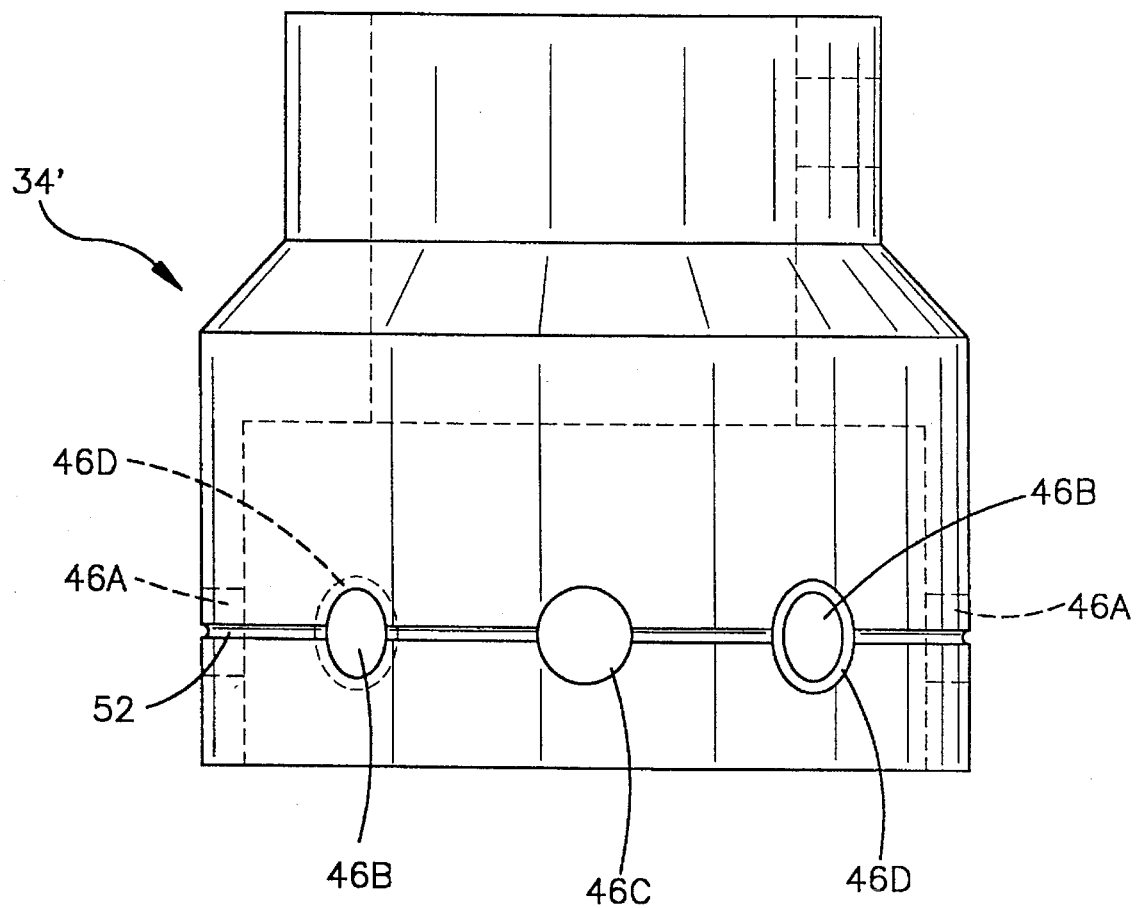
FIG. 4 is a front elevation view of an alternate embodiment of the shaft coupling member of the present invention which includes a radial array of differing diameter pairs of aligned apertures.

FIG. 4 illustrates an alternate embodiment of the pump apparatus 10 of the present invention. In the alternate embodiment, a coupling member 34' includes a radial array of aligned apertures of different sizes. By way of example, FIG. 4 shows a coupling member 34' having four sets of aligned apertures 46A, 46B, 46C, 46D, ranging from a smallest diameter to a largest diameter. Corresponding to the set of apertures 46A, 46B, 46C, 46D would be a set of shear pins (not shown) of corresponding diameters (and, therefore, having different cross sectional areas). This alternate embodiment would permit the user to choose a shear pin having a cross sectional area close to the required shear pin cross sectional area. This would eliminate the necessity of drilling a longitudinal throughbore in a shear pin when the required shear pin cross sectional area is less than the cross sectional area of the solid shear pin. The impeller shaft crossbore (not shown) would, of course, be drilled to match the chosen shear pin size.

While the preferred embodiment of the present invention contemplates a pump apparatus 10 utilizing the female coupling member 34 having the shear pin 44 securing the impeller shaft 22 to the coupling member, it should be noted that interchanging the respective positions of the shear pin 44 and the bolts 40 would result in an equally efficacious alternate embodiment. In this alternate embodiment (not shown), the shear pin 44 would pin the motor drive shaft 32 to the coupling member 34, while the bolts 40 (or some other fastening means) would affix the impeller shaft 22 to the coupling member 34.

The present invention has been described with particularity. It is the intent, however, that the invention include all modifications and alterations from the disclosed design falling within the spirit or scope of the appended claims.

I claim:

1. Apparatus for pumping molten metal, the apparatus comprising:

a) a submergible pump housing;

b) a rotatable impeller disposed within the pump housing;

c) an impeller shaft having a first and second end, the first end coupled to the impeller and extending through an opening in the pump housing;

d) a motor-driven rotating drive shaft;

e) a coupling member engaging an end of the drive shaft and the second end of the impeller shaft; and f) a shear pin extending between the coupling member and one of said drive shafts and said impeller shafts.

2. The apparatus of claim 1 wherein the coupling member is a female coupling member having two shaft receiving openings receiving the drive shaft end and the second end of the impeller shaft.

3. The apparatus of claim 1 wherein the coupling member has a pair of apertures diametrically aligned transversely of the drive and impeller shafts and one of the shafts has a transverse bore aligned with the apertures.

4. The apparatus of claim 1 wherein the transverse bore is in the impeller shaft.

5. The apparatus of claim 3 wherein the apparatus additionally includes structure for maintaining the shear pin in place in the apertures and transverse bore, the structure including:

a) an annular groove in an outer periphery of the coupling member, the groove being interrupted by each of the aligned apertures; and b) a wire having a length greater than the circumference of the coupling member and disposed in said annular groove with end portions twisted together.

6. The apparatus of any one of claims 1–5 wherein the shear pin is comprised of a material having a shear strength value less than a fracture point torsional strength value of a selected one of the impeller, the impeller drive shaft, drive shaft and coupling member.

7. The apparatus of claim 6 wherein the shear pin is comprised of graphite.

8. The apparatus of any one of claims 1–5 wherein the shear pin is comprised of a material having a shear strength value which does not decrease as a result of repeated application of shearing forces to the pin which are less than the pin's shear strength value.

9. A coupling member for coupling motor-driven drive shaft and an impeller shaft of a molten metal pump apparatus, the coupling member comprising:

a) a housing having two shaft-receiving openings, one to receive an end portion of the motor-driven drive shaft and one to receive the impeller shaft, the housing further including an aperture for receiving a shear pin;

b) the shear pin received in the aperture and extending into one of the open ends; and c) a pin retainer connected to one of the shear pin and housing.

10. The coupling member of claim 9 wherein the pin retainer includes:

a) an annular groove in an outer periphery of the coupling member, the groove intersecting the aperture; and b) a wrapping wire having a length greater than an circumference of the coupling member and disposed in said annular groove with end portions twisted together to hold the shear pin in place.

11. The coupling member of claim 9 wherein the shear pin is comprised of graphite.

12. The coupling member of claim 9 wherein the shear pin is comprised of a material having a shear strength value which does not decrease as a result of repeated application of shearing forces to the shear pin which are less than the pin's shear strength value.

13. The coupling member of claim 9 wherein the shear pin is comprised of a material having a shear strength value less than a fracture point torsional strength value of a selected one of the impeller shaft, drive shaft and coupling member.

* * * * *